(12) United States Patent
Martinez et al.

(10) Patent No.: US 8,246,845 B2
(45) Date of Patent: Aug. 21, 2012

(54) FORMATION OF DEEP PIT AREAS AND USE THEREOF IN FABRICATION OF AN OPTIC RECORDING MEDIUM

(75) Inventors: Christophe Martinez, Grenoble (FR); Alain Fargeix, Meylan (FR)

(73) Assignee: Commissariat a l'Energie Atomique, Paris (FR)

( * ) Notice: Subject to any disclaimer, the term of this patent is extended or adjusted under 35 U.S.C. 154(b) by 1185 days.

(21) Appl. No.: 12/010,715

(22) Filed: Jan. 29, 2008

(65) Prior Publication Data
US 2008/0292785 A1 Nov. 27, 2008

(30) Foreign Application Priority Data
Feb. 8, 2007 (FR) .................................. 07 00901

(51) Int. Cl.
C23F 1/00 (2006.01)
C03C 25/68 (2006.01)
B29D 11/00 (2006.01)

(52) U.S. Cl. ................. 216/62; 216/87; 216/24; 216/51

(58) Field of Classification Search .............. 216/58, 216/24, 83, 41, 51, 62, 87, 11; 438/689, 438/700, 29; 430/270.1; 427/125; 365/163; 428/64.1
See application file for complete search history.

(56) References Cited

U.S. PATENT DOCUMENTS

| | | | | |
|---|---|---|---|---|
| 4,450,041 A * | 5/1984 | Aklufi | ............................. | 216/87 |
| 5,051,340 A * | 9/1991 | Tyan et al. | .................... | 430/321 |
| 6,288,998 B1 | 9/2001 | Taira | | |
| 2002/0054561 A1* | 5/2002 | Inase et al. | ................ | 369/275.3 |
| 2004/0110094 A1* | 6/2004 | Chen et al. | .................... | 430/311 |
| 2004/0209199 A1* | 10/2004 | Kishima et al. | .............. | 430/320 |
| 2004/0241589 A1 | 12/2004 | Ito et al. | | |
| 2005/0045587 A1 | 3/2005 | Kawaguchi et al. | | |
| 2005/0226999 A1* | 10/2005 | Kouchiyama et al. | ........ | 427/162 |
| 2006/0280043 A1* | 12/2006 | Ovshinsky et al. | ........ | 369/13.02 |
| 2006/0290018 A1 | 12/2006 | Tomekawa et al. | | |
| 2007/0054493 A1* | 3/2007 | Nam | .............................. | 438/689 |

FOREIGN PATENT DOCUMENTS

| | | |
|---|---|---|
| EP | 1 482 494 A2 | 12/2004 |
| JP | A 9-115190 | 5/1997 |
| WO | WO 2005/101398 A1 | 10/2005 |
| WO | WO 2006/027732 A2 | 3/2006 |

\* cited by examiner

*Primary Examiner* — Shamim Ahmed
*Assistant Examiner* — Bradford Gates
(74) *Attorney, Agent, or Firm* — Oliff & Berridge, PLC

(57) ABSTRACT

A pit is formed from a stack comprising at least one first layer formed by a material able to change physical state and a second layer made of the same material as that forming the first layer, but in a different physical state. An area of the first layer is treated to make said area go from its initial physical state to the physical state corresponding to that of the second layer. A selective etching step is then performed to eliminate said area of the first layer and the area of the second layer initially covered by the treated area of the first layer. Advantageously, said material is a phase transition material.

9 Claims, 3 Drawing Sheets

FORMATION OF DEEP PIT AREAS AND USE THEREOF IN FABRICATION OF AN OPTIC RECORDING MEDIUM

BACKGROUND OF THE INVENTION

The invention relates to a method for forming at least a pit comprising the following successive steps:
- localized treatment of at least an area of a first layer formed by a material able to change physical state, to make said area go from a first physical state to a second physical state,
- and selective etching of said area via a free surface of said first layer.

The invention also relates to use of such a method in fabrication of an optic recording medium.

STATE OF THE ART

Optic recording media or disks generally comprise at least a polycarbonate substrate comprising raised areas and recessed areas, also known as "lands" and "pits", and corresponding to information data. The substrates thus comprise a free surface patterned according to a predetermined pattern.

Such substrates are generally produced in large quantities by injection molding using a mold or a matrix support, also known as master disk or stamper. One of the free surfaces of the matrix support is patterned in complementary form to the predetermined pattern required for the substrates. The matrix support is obtained from an original model. For example, US Patent application US-A-2005/0045587 describes a method for producing the original model used for fabrication of optic disks and the method of fabrication of said optic disks. The original model is produced from a stack comprising a substrate, for example made of glass or silicon, and a heat-sensitive material layer. The heat-sensitive material is an antimony oxide able to change state when a heat rise occurs caused by exposure of said layer to light. The free surface of the heat-sensitive material layer is patterned by exposing certain areas of said free surface to a laser beam and eliminating said exposed areas. Such an operation thereby enables lands and pits to be made in the heat-sensitive material layer. The original model obtained is then used to form a metal master disk designed to act as mold for fabrication of the optic disks by injection molding.

Since the appearance of the method of storing data on optic recording media, in particular on Compact Disc (CD) type media, the dimensions of the patterns to be engraved have been reduced several times. However, for one of the latest generations of optic recording media comprising optic media using a blue laser, better known by the name of "Blu-Ray" disks, recent developments tend towards formation of deeper pits in the substrate than for usual support media. The depth envisaged for the pits of "Blu-Ray" disks is about 80 nm for Read Only Memories (ROM), whereas for recordable disks (R type disks) and rewritable disks (or RW disks), it is about 40 nm. Conventional methods for fabricating models for optic recording media, such as the one described for example in US Patent application US-A-2005/0045587, do not enable lands presenting such a depth level to be obtained. The phase change caused by heat rise is effectively limited to the surface of the heat-sensitive material layer and does not enable deep patterning of said layer. The thickness of the heat-sensitive material layer is often calculated such as to optimize the thermal response of the material. However, as the areas to be exposed generally have to present a small cross-section, this response is limited in penetration depth. A large thermal penetration depth would in fact assume a large broadening of the area to be exposed and a lengthening of the exposure time which also contributes to broadening of the exposed areas.

In Patent application WO-A-2005/101398, it has been proposed to increase the depth of the pits by arranging an intermediate layer, between the heat-sensitive material layer and the substrate, designed to be patterned to extend the pits formed in the heat-sensitive material layer. The heat-sensitive material layer is then used as mask for exposure. Patterning of the intermediate layer is thereby performed through the heat-sensitive material layer, which is itself patterned. The free areas of the substrate, i.e. the areas of the substrate coinciding with the pits formed in the heat-sensitive material layer and in the intermediate layer, can also be etched so as to increase the depth of the pits even more. In this case, the heat-sensitive material layer forms an etching mask for the substrate.

Such a method enables deeper pits to be obtained than conventional methods. It does however present at least two major drawbacks. The first is that the intermediate layer, generally made of photoresist, has to undergo hardening heat treatment at high temperature, so as to enable deposition of the heat-sensitive material layer. Such a heat treatment does however impair the photosensitivity properties of the photoresist, which may be detrimental for subsequent patterning thereof. Likewise, exposure of the heat-sensitive material layer may impair the properties of the intermediate layer arranged under said layer.

In a more general manner, the problem related to obtaining deep pits arises in other fields than that of optic recording media. This is in particular the case in the lithography field.

In Patent application US-2004/0209199, the heat-sensitive material layer is formed by a stack of two superposed sub-layers made of different materials, for example copper and aluminium. However, once patterned, it is used as mask for etching small convex and concave marks in the substrate. The mask is then removed and the substrate etched in this way is used as original model. Such a method therefore does not enable sufficiently deep pits to be obtained to be used for the latest generations of optic recording media.

OBJECT OF THE INVENTION

The object of the invention is to form deep pits easily and economically in particular when fabricating optic recording media, while at the same time remedying the shortcomings of the prior art.

According to the invention, this object is achieved by the fact that the method comprises, before the localized treatment step, a formation step of a stack consisting of the first layer and a second layer formed by said material in its second physical state, the selective etching step being continued until the area of the second layer initially covered by the treated area of the first layer has been eliminated.

More particularly, the material is a material able to go from a metastable thermodynamic state to a stable thermodynamic state by the action of heat, and in particular a phase transition material.

BRIEF DESCRIPTION OF THE DRAWINGS

Other advantages and features will become more clearly apparent from the following description of particular embodiments of the invention given as non-restrictive examples only and represented in the accompanying drawings, in which.

DESCRIPTION OF PARTICULAR EMBODIMENTS

At least a pit is formed from a stack consisting of:
a first layer formed by a material able to change physical state,
a second layer formed by the same material as that forming the first layer, but in a different physical state from that of the first layer and advantageously more sensitive to etching than that of the first layer.

An area of the first layer is treated via the free surface of the first layer to make said area go from its initial physical state, i.e. that of the whole of the first layer, to another physical state corresponding to that of the second layer.

A selective etching step is then performed via the free surface of the first layer to eliminate said previously treated area of the first layer. The etching step is continued, through the etched first layer, until the area of the second layer initially covered by the treated area of the first layer has been completely eliminated. The first layer then acts as barrier layer or etching mask for the second layer.

The etched areas respectively of the first and second layers then form a pit having a depth which corresponds to the sum of the thicknesses of the first and second layers.

FIGS. 1 to 4 illustrate, for example purposes, a particular embodiment of formation of at least a pit 1 in a stack 2 consisting of:
a first layer 3 made from a material present in a first physical state, for example a metastable thermodynamic state, and able to go to a second physical state, for example a stable thermodynamic state, advantageously due to the action of heat,
and a second layer 4 made from said material in its second physical state.

Figure 1:
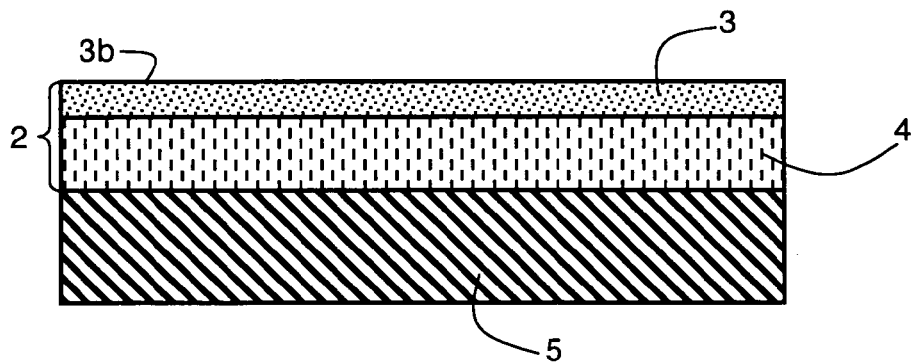
FIGS. 1 to 4 schematically represent, in cross-section, different steps of a particular embodiment according to the invention of a deep pit in a stack.

Stack 2 is in the embodiment represented in FIGS. 1 to 4 formed on a substrate 5, for example made of glass or silicon. As represented in FIG. 1, second layer 4 is arranged between substrate 5 and first layer 3.

The material of the first layer 3 and of the second layer 4 is advantageously a phase transition material, for example an alloy of at least two elements chosen from the group comprising germanium, antimony, tellurium, indium, selenium, bismuth, silver, gallium, tin, lead and arsenic. For example, the material will be obtained by sputtering a $Ge_2Sb_2Te_5$ target.

Phase transition materials do in fact present the advantage of being able to go from amorphous phase to a crystallized phase due to the action of heat. This phase change is for example achieved by causing a temperature rise of said material by applying a focused optic radiation, such as a laser beam, in controlled manner to the surface of said material.

The phase transition material is thus advantageously in amorphous form in first layer 3 and in crystallized form in second layer 4.

Figure 2:
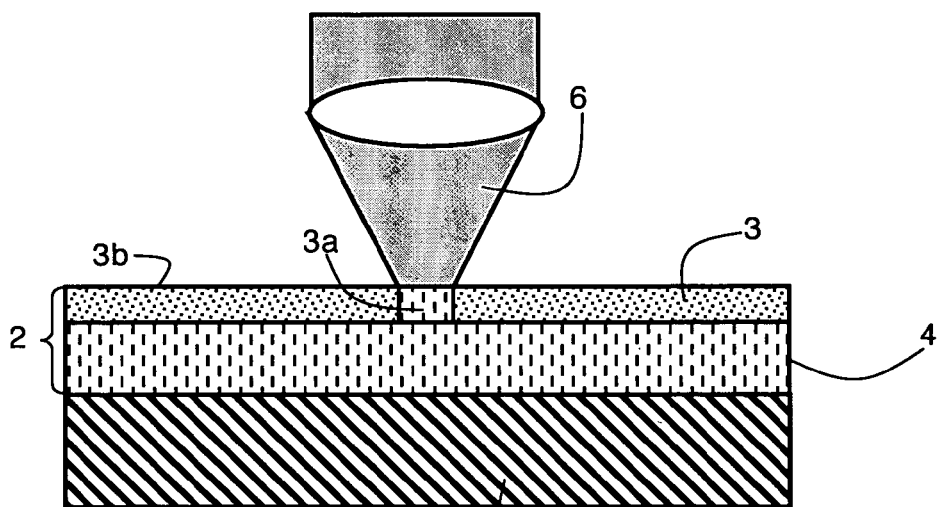

In FIG. 2, an area 3a of first layer 3 is exposed in controlled manner to a focused optic radiation 6 via free surface 3b of said layer 3. Radiation 6 causes a heat rise and a phase change in said area 3a. Exposure of area 3a to focused optic radiation 6, and cooling of said thus heated area 3a if applicable, are controlled in a conventional manner for a person skilled in the art, to bring area 3a to the required phase transition.

The material in said area 3a is then in the same phase as second layer 4, a crystallized phase in the case of a phase transition material, whereas the part of first layer 3 not exposed to optic radiation 6 remains in the initial phase of the material, i.e. amorphous phase in the case of a phase transition material.

Figure 3:
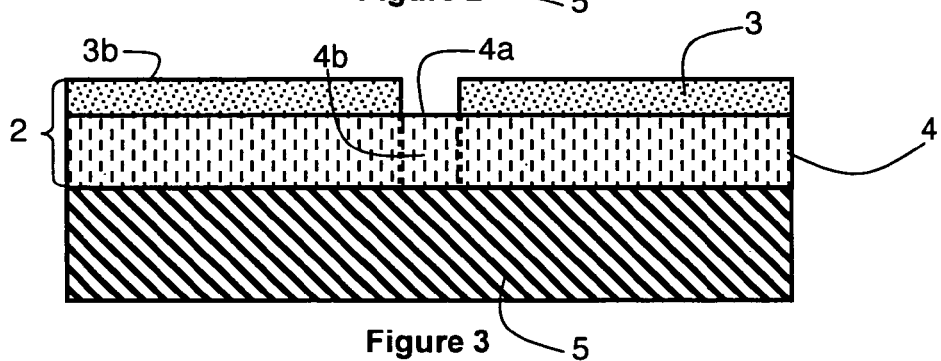

The non-exposed part of first layer 3 presents a lower aptitude to etching than that of exposed area 3a. Preferably, the physical state of the material constituting the non-exposed part of first layer 3 is insensitive to the etching used to eliminate area 3a. Thus, as represented in FIG. 3, area 3a is etched selectively, for example by chemical etching, via free surface 3b of first layer 3, whereas the non-exposed part of first layer 3 is preserved.

Eliminating area 3a releases free surface 4a of an area 4b of second layer 4. Said area 4b corresponds, in second layer 4, to the part initially covered by area 3a of first layer 3. It is represented, in FIG. 3, by the area of second layer 4 located between the two broken lines.

Figure 4:
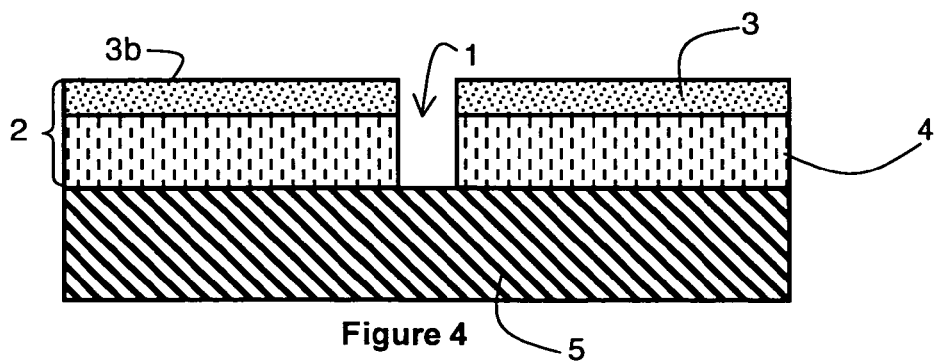

As represented in FIG. 4, the selective etching step is continued through first layer 3 until area 4b has been eliminated and the part of the free surface of substrate 5 initially covered by area 4b has been released. First layer 3 acts, during selective etching of area 4b, as etching barrier layer or etching mask. It therefore only allows etching of area 4b initially located under area 3b, the rest of second layer 4, covered by the non-exposed part of first layer 3 being preserved. Elimination of area 4b may be total or partial, depending on the depth required for the pit to be formed. Furthermore, in the case of a phase transition material, the material in crystalline phase generally presents a column structure enabling etching to be pursued at right angles from free surface 4a. The side walls delineating the space freed by etching of area 4b thereby continuously extend the side walls delineating the space freed by etching of area 3a. In this way, said two freed spaces have an identical lateral cross-section.

The space freed by areas 3a and 4b then forms a pit 1. Advantageously, the depth of pit 1 corresponds to the sum of the thicknesses of first and second layers 3 and 4 when the initial physical state of first layer 3 is insensitive to etching. Such a method enables the depth of the pits to be advantageously increased compared with methods according to the prior art while at the same time being easy to implement. As previously described, the depth of the pits formed in a layer of heat-sensitive material, such as a phase transition material, is in fact limited by the reduced penetration depth of the heat wave caused by optic radiation. According to the invention however, the depth of the pits can be increased while keeping a small exposure cross-section by adding an intermediate layer between the substrate and the initial layer of heat-sensitive material, which intermediate layer is able to be etched in the extension of the initial layer. Moreover, the intermediate layer according to the invention presents the advantage of making the pit formation process easier to implement and more economical than that described in Patent application WO-A-2005/101398. With the method according to the invention, the intermediate layer used, i.e. second layer 4, does in fact remedy the shortcomings of the photoresist layer described in Patent application WO-A-2005/101398. Using an intermediate layer made from the same material as that used for the initial layer in fact facilitates formation of stack 2 without impairing the properties of the latter.

Figure 5:
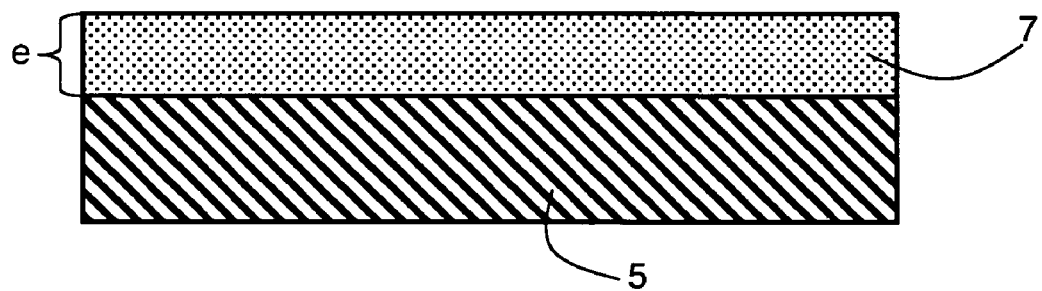
FIGS. 5 to 7 schematically represent, in cross-section, different steps of an embodiment of said stack.
Figure 6:
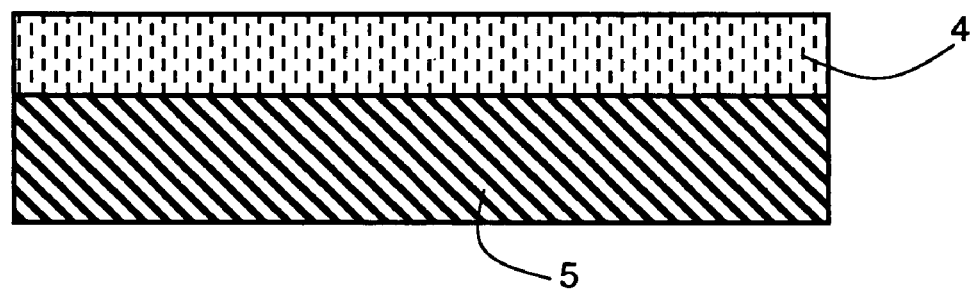
Figure 7:
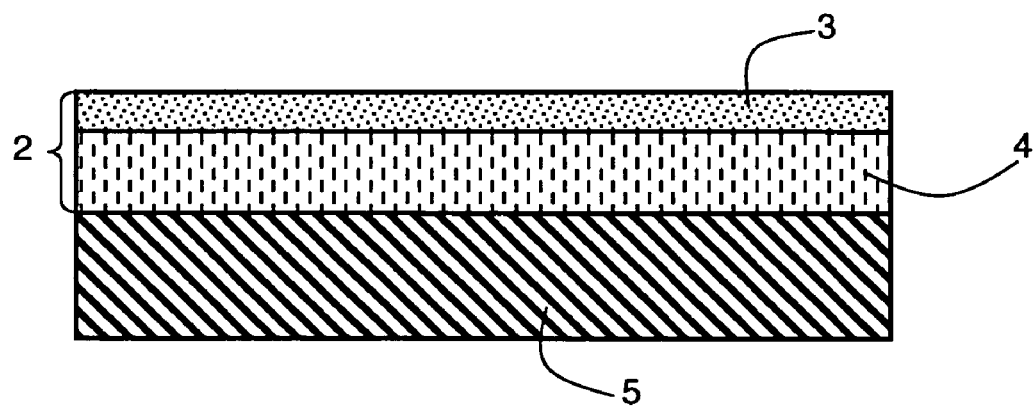

Stack 2 as represented in FIG. 1 is effectively easy to achieve. For example, as represented in FIGS. 5 to 7, stack 2 can be produced by previously forming second layer 4 on substrate 5, and then depositing first layer 3. Second layer 4 is formed by deposition on substrate 5 of a preliminary layer 7 having a predetermined thickness e corresponding to the thickness required for second layer 4. Preliminary layer 7 is formed by depositing the material designed to form first and second layers 3 and 4, in the physical state corresponding to the physical state required for first layer 3. Thus, for a phase transition material, preliminary layer 7 is for example deposited in amorphous form. Preliminary layer 7 is then treated to obtain a phase change. More particularly, the whole of preliminary layer 7 can be subjected to heating, for example by controlled thermal treatment, to obtain the phase change, for example crystallization in the case of a phase transition material. A new deposition of said material in amorphous form is then performed to form first layer 3.

Figure 8:
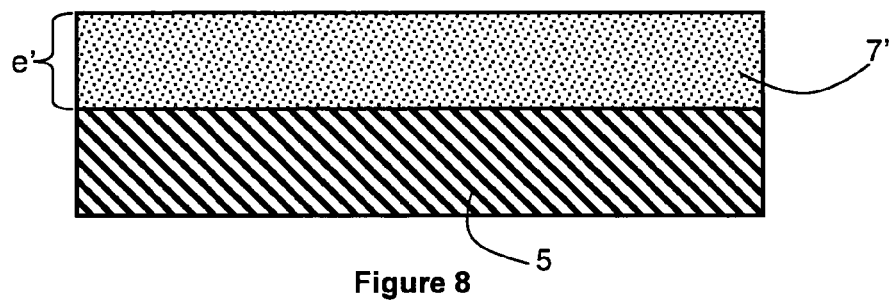
FIGS. 8 to 10 schematically represent, in cross-section, different steps of another embodiment of said stack.
Figure 9:
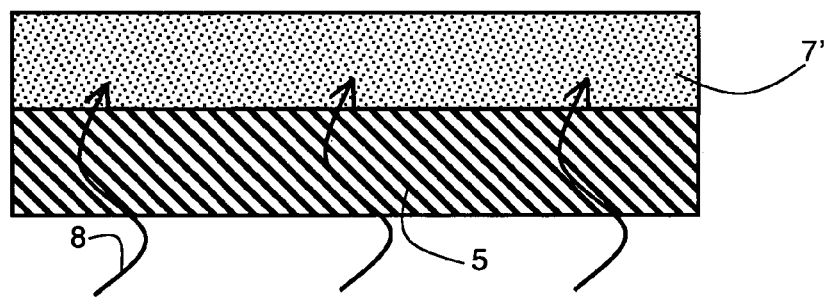
Figure 10:
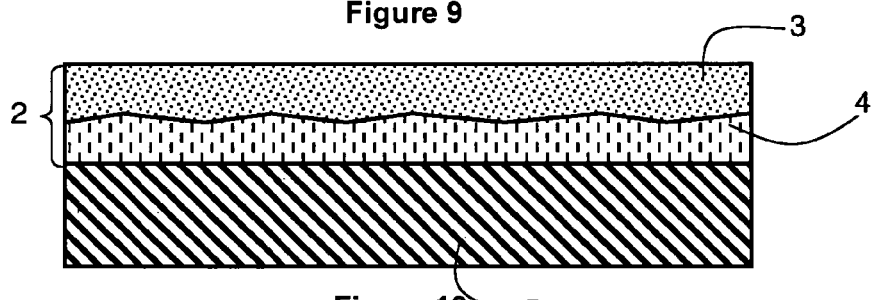

In an alternative embodiment represented in FIGS. 8 to 10, second layer 4 and first layer 3 are not formed on substrate 5 by successive deposition of layers but from a single deposition of a preliminary layer 7'. In this case, like preliminary layer 7 represented in FIG. 5, preliminary layer 7' consists of the material designed to constitute the first layer 3 and the second layer 4. The material forming said preliminary layer 7' is also deposited in the physical state required for first layer 3. Its thickness e' is however larger than the thickness e of preliminary layer 7 represented in FIG. 5. This thickness e' advantageously corresponds to the sum of the thicknesses required for first and second layers 3 and 4. Controlled treatment is then performed via free surface of substrate 5 to make a part of preliminary layer 7' go to the second physical state required for second layer 4. The treatment is applied to the whole of the surface of preliminary layer 7', so that the treated part of preliminary layer 7' forms second layer 4, the rest of preliminary layer 7' forming first layer 3.

For a phase transition material, the controlled treatment is advantageously thermal treatment enabling a part of preliminary layer 7' to go from an amorphous state to a crystalline state. The thermal treatment is for example performed by applying a temperature gradient to preliminary layer 7', which gradient is decreasing from the interface between preliminary layer 7' and substrate 5 to the free surface of preliminary layer 7'. Said thermal treatment, for example performed by applying an optic radiation 8, crystallizes the material over a given depth corresponding to the thickness of second layer 4. In such a case, the thickness of second layer 4 is not limited by application of optic radiation 8. As the latter is in fact applied on the whole of the free surface of the substrate, there is no thermal penetration limitation due to a reduced cross-section requirement of the area to be exposed. In this case, the substrate is naturally transparent to said optic radiation 8.

For example, a stack 2 comprising a first layer 3 with a thickness of 30 nm and a second layer 4 with a thickness of 50 nm was produced according to this embodiment from a preliminary layer 7', for example made from amorphous $Ge_2Sb_2Te_5$ with a thickness of 80 nm. Crystallization of second layer 4 is obtained by heating preliminary layer 7' through substrate 5 to 200° C. in an inert atmosphere. Heating is performed by exposure by means of a laser beam focused at a wavelength of 405 nm, with a numerical aperture of 0.9 and a power of 2 mW. The beam is moved over the substrate 5 with a linear speed of close to 1 m/s. An etching step is then performed to form deep pits in a NaOH bath at ambient temperature.

Figure 11:
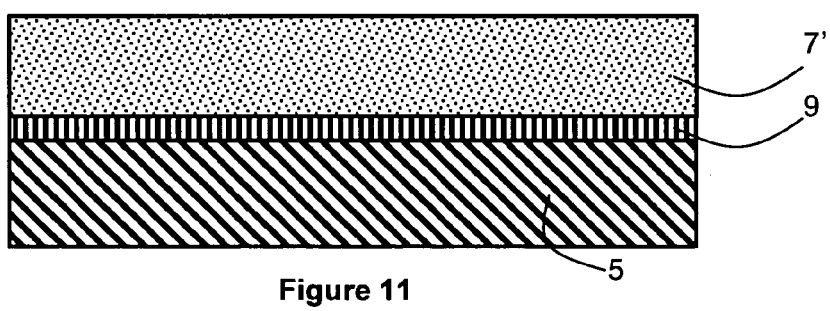
FIGS. 11 and 12 schematically represent, in cross-section, alternative embodiments of the stack used when deep pits are formed.
Figure 12:
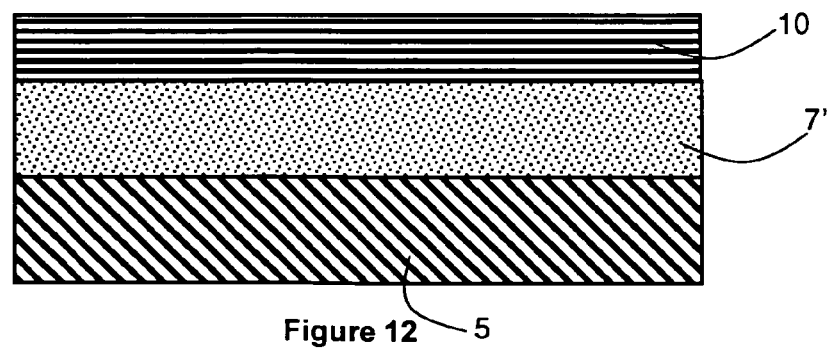

As represented in FIG. 11, an intermediate layer 9 can be deposited before deposition of the preliminary layer 7' to enhance change of state of the material forming preliminary layer 7'. In the case of a phase transition material, intermediate layer 9 acts for example as seed for crystal germination. Intermediate layer 9 can for example be obtained by deposition of germanium nitride (GeN). It can also be used in the embodiment represented in FIG. 5, before deposition of preliminary layer 7.

Finally, a top layer 10 can be deposited on preliminary layer 7' before the controlled treatment designed to form second layer 4 is performed. Its role is to keep the top part of preliminary layer 7' at a given temperature during the controlled treatment step, and for example to foster application of the thermal gradient between the opposite two surfaces of said layer 7'. Top layer 10 is then formed by a material that is added onto stack 2.

Such a method can be more particularly used for fabrication of optic recording media such as "Blu-Ray" disks, and in particular for fabrication of masters.

It can also be used in other fields requiring formation of deep pit areas and more particularly in lithography processes. For example it can be used for fabrication of micro electro mechanical systems (MEMS) or in the microfluidics field for biology or chemistry applications.

The invention is not limited to the embodiments described above. More particularly, the material applicable to the field of the invention is not necessarily a phase change material. It can be of any type provided it is able to change physical state. For example the material can be a sub-stoichiometric oxide such as a molybdenum oxide $MoO_x$. Such a material does not change phase, but can transform by thermal treatment into $MoO_2/Mo$, i.e. aggregates of $MoO_2$ with residues of molybdenum (Mo). Pits can thereby be formed in a stack comprising a $MoO_x$ first layer and a second layer comprising $MoO_2/Mo$. The second layer is for example obtained by heating a $MoO_x$ layer. Then localized heating of the $MoO_x$ first layer enables at least one $MoO_2/Mo$ area to be obtained. Selective etching is then performed, for example by HNO3, to eliminate the molybdenum and the nearby $MoO_2$ aggregates. The $MoO_2/Mo$ area of the first layer and the area of the second layer located under said $MoO_2/Mo$ area of the first layer are eliminated to form a pit. Other materials can also be envisaged such as $Pt_x$, $MnO_x$.

We claim:

1. A method for forming at least a pit comprising the following successive steps:
    formation of a stack consisting of a first layer and a second layer, the first and second layers being formed by a same material able to change physical state and respectively in a first physical state and in a second physical state,
    localized treatment of at least an area of the first layer to make said area go from the first physical state to the second physical state, and
    selective etching of said area via a free surface of said first layer, the selective etching being continued until an area of the second layer initially covered by the area of the first layer has been eliminated.

2. The method according to claim 1, wherein the formation of the stack is achieved by forming the second layer on a substrate and then by depositing the first layer.

3. The method according to claim 2, wherein the second layer is formed by depositing said material in the first physical state on the substrate and then by treating said material to make the material go to the second physical state.

4. The method according to claim 1, wherein the formation of the stack is achieved by depositing a preliminary layer formed by said material in the first physical state on a substrate, and then by performing a controlled treatment via a free surface of the substrate to make a part of the preliminary layer go to the second physical state, said part of the preliminary layer forming the second layer.

5. The method according to claim 2, wherein an intermediate layer enhancing change of state of the material is deposited on the substrate before the formation of the stack is achieved.

6. The method according to claim 1, wherein said material is a material able to go from a metastable thermodynamic state to a stable thermodynamic state by the action of heat.

7. The method according to claim 6, wherein said material is a phase transition material.

8. The method according to claim 7, wherein the phase transition material is an alloy of at least two elements selected from the group consisting of germanium, antimony, tellurium, indium, selenium, bismuth, silver, gallium, tin, lead and arsenic.

9. A method of fabricating an optic recording medium utilizing the method according to claim 1.

* * * * *